Sept. 23, 1969   O. W. PFEIFER ET AL   3,468,750
REFRACTORY BODIES WITH THERMAL BARRIER ADHESIVE
COATINGS AND METHOD THEREFOR
Filed March 4, 1964   2 Sheets-Sheet 1

INVENTOR.
OLIVER W. PFEIFER
WILLIAM C. TAYLOR
BY
ATTORNEYS

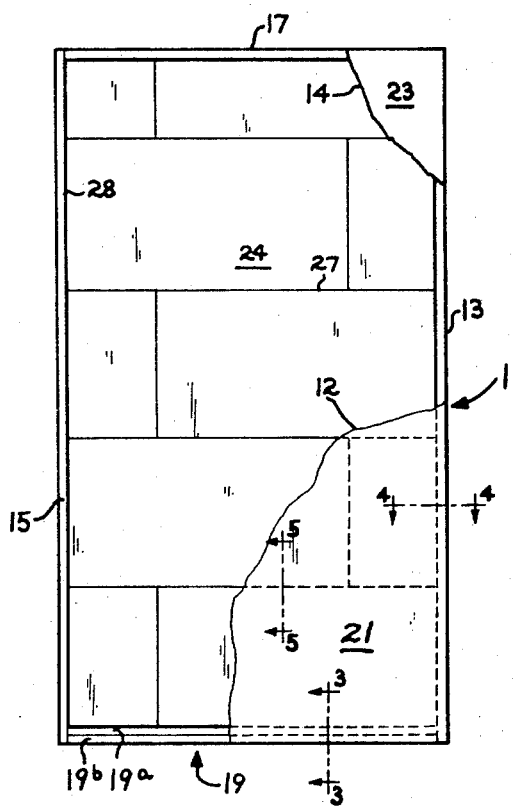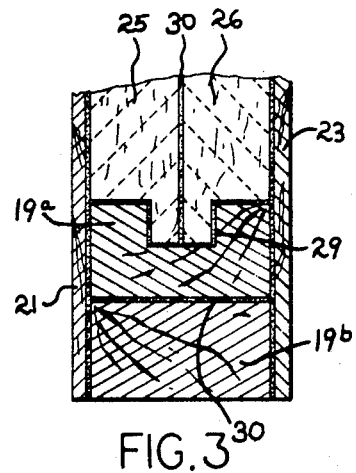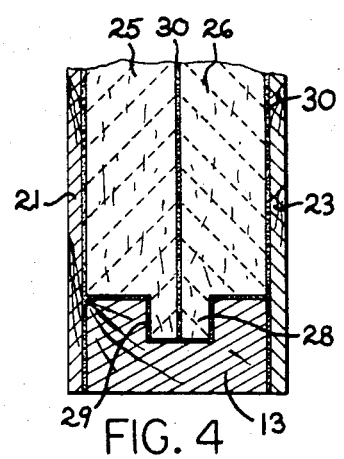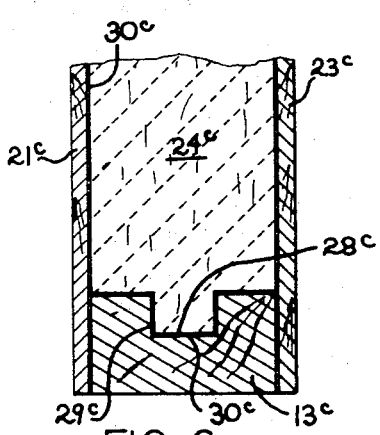

United States Patent Office 3,468,750
Patented Sept. 23, 1969

3,468,750
REFRACTORY BODIES WITH THERMAL BARRIER ADHESIVE COATINGS AND METHOD THEREFOR
Oliver W. Pfeifer and William C. Taylor, Toledo, Ohio, assignors to Owens-Corning Fiberglas Corporation, a corporation of Delaware
Filed Mar. 4, 1964, Ser. No. 349,359
Int. Cl. B32b 9/04, 3/10
U.S. Cl. 161—191                    15 Claims

ABSTRACT OF THE DISCLOSURE

A refractory body containing a thermal barrier coating composed of an air dried mixture initially including a major proportion of finely divided refractory, a minor proportion of a mixture of a basic metal oxide and a water soluble phosphate salt and a minor proportion of colloidal silica, as well as methods of producing such bodies.

---

The present invention relates to the art of adhesives. More particularly, the present invention relates to an adhesive or bonding material serving as a thermal and/or insulative barrier and to specific articles embodying such a bonding material or adhesive. In other words, the invention envisions laminates broadly.

The adhesive to which the present invention relates finds particular utility in the production of "fire doors" and, as a consequence, the invention will be described in connection therewith, although it will be apparent from the following disclosure that the novel and unique features thereof will be inherently utilitarian in a host of other applications.

"Fire doors" are an important component of commercial buildings such as office buildings, hotels, apartments, hospitals, schools and other constructions housing structures of public assembly. The "fire doors" are utilized to separate rooms, offices and other components of a building from the corridors or hallways for the purpose of containing a source of fire or heat until preventative, exterminating or evacuating procedures can be put into play thereby saving life and property.

One material that has been found to be very desirable as a structural component of a "fire door" is a slab-like block of hydrous calcium silicate possessed of low density, low coefficient of heat transfer and, in addition, structural integrity upon exposure to temperatures in the range of 2000° F.

Prior to the present invention, the hydrous calcium silicate slabs were joined with the other components of the door, e.g., the frame members, referred to in the door art as stiles, rails and facings, by means of a variety of organic adhesives such as the phenolic and resorcinol glues. These glues required a hot pressing operation to set the glue and to complete the uniting of the several components. Furthermore, being organic, these glues were combustible.

It is an object of the present invention to provide a novel adhesive composition which possesses very desirable thermal characteristics, particularly the characteristic of being refractory to elevated temperatures while at the same time possessing adhesive properties.

It is also an object of the present invention to provide a "fire door" construction of improved ability to withstand elevated temperatures for a longer period of time than known heretofore.

It is still another object of the present invention to provide a thermal bonding material which can be easily applied as an aqueous paste, spreadable or flowable, whereby the use of solvents and thinners of flammable character are precluded.

It is still another object of the present invention to provide an adhesive of the type herein disclosed which is capable of maturing or drying to the set condition at room temperature whereby the production of "fire doors" and other similar structural members is substantially simplified.

It is also an object of the present invention to provide a thermal bonding material of the type concerned which may be easily prepared from readily available components without the necessity of employing any exotic or complex preparation techniques.

It is a particular object of the present invention to provide an adhesive-like coating of utility in forming laminates of a variety of materials; one of which is composed of a hydrous calcium silicate exemplified by a porous body structure composed of pure synthesized crystals integrated with each other to provide a low density product of refractory character at elevated temperature.

It is also an object of the present invention to provide an improved "fire door" construction which, although it may employ decorative wood or plastic facing members, is possessed of very desirable overall thermal insulation properties.

It is a particular object of the present invention to provide a laminated door construction which meets the approval of Underwriters' Laboratory, Inc., tested in accordance with ASTM E152–58.

The foregoing as well as other objects of the present invention will become apparent to those skilled in the art from the following detailed description taken in conjunction with the annexed sheets of drawings on which there are presented, for purpose of illustration only, several embodiments of the present invention, and the recitation of examples.

In the drawings:

FIG. 2 is a front elevation view, partially broken, of a "fire door" construction showing the employment of plurality of slabs of hydrous calcium silicate in offset relationship.

FIG. 3 is a sectional view taken on the line 3—3 of FIG. 2.

FIG. 4 is a sectional view taken on the line 4—4 but turned 90°.

FIG. 5 is a sectional view taken on the line 5—5 of FIG. 2.

FIG. 6 is a sectional view similar to that of FIG. 4 but serving to show another embodiment.

Figure 1:
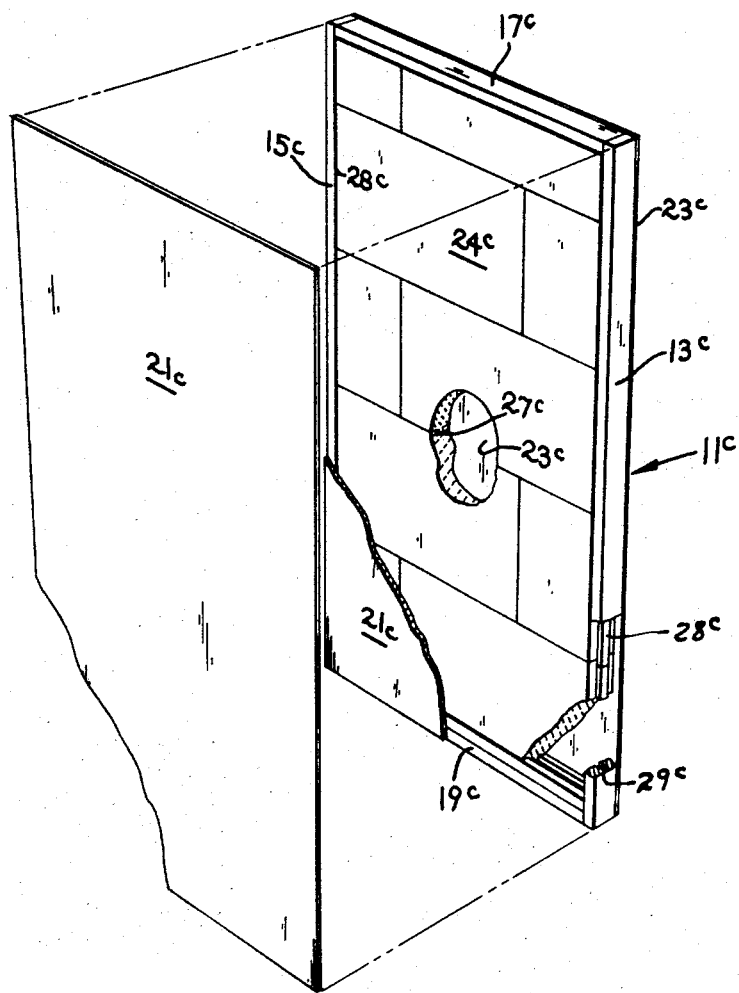
FIG. 1 is a perspective view, partially broken away, of a "fire door" construction including the thermal bonding adhesive of the present invention; certain components of the construction being separated from the door proper in order to better disclose the interior features of construction.

In its simplest form, the present invention contemplates the discovery of the unique fire-resistant and adhesive characteristics of an aqueous, paint-like viscosity mixture including, as components, a basic material (oxide or hyproxide), a phosphate salt and a major proportion of a finely divided refractory composed principally of silica ($SiO_2$) or a precursor of silica, particularly in the uniting of a variety of bodies, formed of, for example, wood and/or metal, with a hydrous calcium silicate body resulting from the reaction of lime and silica under saturated steam and above atmospheric pressure conditions. A particularly preferred embodiment of the invention envisions the inclusion in the aqueous mixture of a minor proportion of a colloidal silica, sometimes referred to in the art as a silica sol.

The present invention additionally contemplates a novel door construction comprising structural members defining a frame, an insulative core of hydrous calcium silicate insulating material embraced by the frame and a coating for adhesively securing together the frame and core, the coating being applied as an aqueous mixture of paint-like viscosity; said mixture including a basic oxide or hydroxide, a water soluble acid phosphate salt and a major proportion of a finely divided refractory composed principally of silica or a precursor of silica.

Referring now more specifically to the drawings, there will now be disclosed in connection with FIGS. 2–5 a novel "fire door" construction representing one embodiment of the present invention. The door 11 is, in part, defined by a rectangular frame composed of vertical, spaced, linear side members 13 and 15 connected at their upper and lower extremities respectively by linear horizontal "rails" 17 and 19. The vertical frame members 13 and 15 are frequently referred to in the construction art as "stiles." Wooden facing panels 21 and 23, serving a decorative function, are secured on either side of the rectangular frame and embrace therebetween the core formed of hydrous calcium silicate insulating materials precut into elongated slabs 24. In the embodiment illustrated in FIGS. 2–5, the slabs 24 are of laminated construction, thus being composed of two thicknesses 25 and 26. The side edges 27 of the slabs are fabricated so as to be either of tongue or groove contour. The tongue and groove edge contour of the core calcium silicate insulating material is shown in FIG. 5. The end edges 28 of the slabs 24 which engage the frame members 13, 15, 17 and 19 are all of tongue configuration. Correspondingly, the just-mentioned frame members are provided with a groove 29 to accommodate the tongue formed on the mating edge of the core material.

The door 11 as shown in FIG. 2 is broken away on the lines 12 and 14 to show the front facing sheet 21 and the rear facing sheet 23 and the interior composed of the core material defined by the elongated slabs of hydrous calcium silicate disposed in edge to edge as a horizontal array involving tongue and groove edge to edge relationship.

The upper rail 17 can be formed of one linear piece of wood, or of two pieces, similar to the lower rail 19 shown in FIG. 2 as being composed of a two-piece construction, i.e., two linear members 19a and 19b secured together by the adhesive coating 30. The components 25 and 26 forming the slab 24 (FIG. 3) are also secured together by a layer of the bonding material 30. The facing panels 21 and 23 are likewise secured to the components 25 and 26 by a layer of the bonding material 30. The mating edges of the slab core material are also united to the frame members 13, 15, 17 and 19 by the bonding adhesive material 30. The mating edges of the individual slabs, identified by the reference numeral 27, are not required to be bonded together by the adhesive coating.

The "fire door" construction illustrated in FIGS. 1 and 6 is identical, in all respects but one, with the "fire door" construction illustrated in FIGS. 2–5 and all of the component parts are identified in those figures with the same numerals but bearing the subscript c. The single departure of the door 11c from the door 11 is that the slabs of hydrous calcium silicate material are of one-piece construction, rather than the laminated construction illustrated by reference numerals 25 and 26 in FIGS. 3–5. This is shown most clearly in FIG. 6, wherein it can be seen that the slab 24c has a tongue 28c formed on its one edge which engages the groove 29c formed in the vertical side member 13c. This just-described tongue and groove joint is secured by the coating 30c, while at the same time the facing sheets of wood 21c and 23c are similarly bonded to the slab material.

The planar facings 21 and 23 serve in the main a decorative function and are usually fabricated of wood and/or plastic selected to conform with the overall decor of the building, apartment, office, lobby or the like.

It is an important feature of the present invention that the bonding or coating material 30 serves to very effectively adhere the several components of the door construction together, while at the same time the material serves as a thermal barrier, as it were, resisting fire in elevated temperature in accordance with the intended purpose of the door construction.

The door, in accordance with the present invention and as described hereinabove in connection with the drawings, is assembled very conveniently by simply first locating one of the facing sheets horizontally on a flat surface, applying a coating of the bonding material by brush or spray gun and thence positioning the other elements into assembled configuration therewith as shown in FIG. 2, making sure that all of the engaging surfaces are first coated with the adhesive bonding material which will be described in more detail hereinafter. Thus, the frame members and slabs of hydrous calcium silicate are arranged in mating contact after first applying a coating of the adhesive bonding material and, lastly, the opposed facing sheet is laid down on top of the assembly and sufficient weight applied to hold the assembly in firm abutting contact. Room temperature conditions are all that is required to effect a setting of the bonding material and this can normally be expected to occur in about 15 minutes.

The frame members, e.g., the "stiles" and "rails," are usually formed of hard maple and may be, additionally, treated with a commercial fire retardant such as a material marketed under the tradename "Non-Com" by the Koppers Company, Inc., of Pittsburgh, Pa., or a similar material made by the Protexal Corp., of Kenilworth, N.J.

The thermal barrier adhesive coating which unites the structural components of the "fire door" is composed of an aqueous mixture, of generally paint-like viscosity, including minor proportions of a basic material, for example, a basic metal oxide or hydroxide, preferably magnesium oxide, together with a water soluble phosphate salt and a major proportion of a finely divided refractory. A preferred formulation is described in Example I hereinbelow.

EXAMPLE I

The ingredients listed in Table 1 hereinbelow are combined in a suitable blending tank.

Table 1

| Material: | Parts by weight | |
|---|---|---|
| Fused magnesium oxide (MgO)— | | |
| 325 mesh | 4.00 | |
| Mono magnesium phosphate [$Mg(H_2PO_4)_2$] | 2.75 | |
| Ammonium phosphate ($NH_4H_2PO_4$) | 4.50 | |
| Silica: | | |
| 50 mesh | 27.00 | |
| 100 mesh | 25.00 | |
| 200 mesh | 36.75 | |
| | | 100.00 |
| Colloidal silica (15% solids, remainder water) | 30.00 | 4.50 |
| | | 104.50 |

The foregoing ingredients are mixed in the blender to form an aqueous mixture/slurry of generally paint-like viscosity. Water, of course, in varying proportions can be added to the above formulation, depending in part upon the silica concentration of the colloidal silica component.

The coating material can be, and preferably is, immediately utilized in coating the members to be bonded together. When utilized in the production of a "fire door" as described hereinabove, it will be found that the thermal barrier adhesive coating hardens (or sets) readily at room temperature in about 15 minutes without the application of elevated temperatures or extraordinary setting pressure.

The proportion of colloidal silica (Table 1) can be varied over a considerable range. Thus, the amount of these ingredients will largely determine the viscosity of the adhesive. Adjustment of the viscosity can thus be made to suit the particular application. Preferably, the amount of colloidal silica, assuming a 15% $SiO_2$ solids concentration, is selected so as to fall within the range of from 20 to 40 parts by weight per 100 parts of the total of refractory, phosphate and basic material (the magnesium oxide). It can be seen therefore that the colloidal silica preferably ranges from 3 to 6 parts by weight (on a solids basis) per hundred parts of the total of refractory, phosphate and basic material.

The colloidal silica (silica sol) ingredient of the adhesive coating, in addition to contributing silica, appears to inhibit absorption of the coating into any substrate having a porous composition or character. This attribute is particularly evident where the substrate constitutes the hydrous calcium silicate insulating materials to which the adhesive, thermal-barrier coatings of the present invention are particularly well suited. The absorption inhibiting function permits effective adhesion to be accomplished with a minimum of coating material without any diminishment of the insulation or thermal-barrier function.

The formulation given in Example I hereinabove represents the optimum proportioning of the several ingredients of our coating in terms of extremely efficacious results as to providing good adherence between structural components; one of which is a hydrous calcium silicate as more particularly described hereinbelow, in terms of thermal characteristics to be described hereinafter and in terms of efficiency of coverage.

Various substitutes can be made, however, without any serious impairment of properties. Thus, in place of the magnesium oxide, one can select either the oxides or hydroxides of calcium, strontium, zinc, cadmium, copper, lithium and barium. The fused magnesium oxide of about 325 mesh is eminently preferred, however, since the resulting bond of the coating material containing it is more tenacious and also harder.

The acid phosphate salts may be selected from the acid salts of ortho, meta and pyrophosphoric acid with lithium, magnesium, calcium, ammonium, strontium, barium, copper, zinc, cadmium, etc. There may also be used the organic amino compounds such as primary, secondary and tertiary methyl, ethyl and n-propyl amine phosphates. Because of their commercial availability and performance, mono ammonium phosphates and mono magnesium phosphates are preferred water soluble acid phosphates for use in the preparation of the thermal barrier adhesives of the present invention.

The refractory component of the thermal barrier adhesive preferably comprises finely divided silica as well as a proportion of colloidal silica. Other refractory materials may be employed, however, such as quartz, tridymite, cristobalite, tripoli, diatomaceous earth, etc. Other oxides of the silicon group may be used, either in whole or in part. For example, the oxides of titanium, zirconium and thorium, as well as other refractory materials, such as the non-plastic refractory clays, fire clay, kaolinite, sillimanite, andalusite, mullite, silicon carbide, zirconium silicate, titanium silicate, the spinels, refractory aluminum oxide, etc., may be used to replace at least a part of the silica, if desired, or various combinations of these differing refractory materials may be utilized. Most desirably, it has been found that the refractory should be composed of a balanced composition of silica running from 50 mesh through 325 mesh and, additionally, a proportion of silica sol or colloidal silica should be included in order to yield the best results in terms of quality, adhesion, resistance to elevated temperature, hardness or imperviousness and coverage efficiency.

The basic material, most preferably, fused magnesium oxide, should ideally constitute between 4 to 10% of the total composition excluding, of course, the water. Similarly, the water soluble acid phosphates should be maintained in the range of 7 to 19% based on the total solids. It has additionally been found that the basic material within the foregoing range should be present in slight excess, e.g., 1 to 3%, of that necessary to neutralize the acid phosphate salt. The refractory, preferably finely divided silica, constitutes the major proportion of the solids and it is maintained within the range of 70 to 90%.

Colloidal silica, also frequently referred to as silica sol, is available in a range of percent solids. Reference may be had to U.S. Patent Nos. 2,574,902 and 2,577,485 for a more complete description of these materials and methods of manufacturing them. A suitable and frequently desirable silica sol for use in the practice of the present invention as an ingredient of the thermal barrier, adhesive coating may be produced in accordance with the teachings of U.S. Patent No. 3,083,167 assigned to the same assignee as the present application.

One advantage attendant the inclusion of colloidal silica in the adhesive thermal barrier composition of the present invention lies in the fact that a relatively small quantity of adhesive is effective to accomplish good bonding. It is suspected, although there is no intent to be bound by any theory, that in the case of the hydrous calcium silicate bodies, that the voids inherent in the porous crystalline structure are filled by the colloidal silica component wherein rapid gellation occurs, perhaps by an ionic mechanism inherent in the surface thereof, whereby further absorption of the aqueous adhesive mixture is precluded.

The thermal barrier adhesive coatings as described hereinabove are extremely effective in adhesively uniting dissimilar materials. This is particularly striking where one of the dissimilar materials, as indicated hereinabove, is a hydrous calcium silicate insulating material. The hydrous calcium silicate insulating materials are more accurately described as porous, three-dimensional, crystalline, integrated structures composed of an integrated mixture of crystals, which in some cases include a portion having the formula $4CaO \cdot 5SiO_2 \cdot 5H_2O$ and a portion having the formula $5CaO \cdot 5SiO_2 \cdot H_2O$. The crystalline structure identified by the formula $4CaO \cdot 5SiO_2 \cdot 5H_2O$ is commonly referred to as tobermorite, while a crystal in accordance with the structure $5CaO \cdot 5SiO_2 \cdot H_2O$ is identified as xonotlite. A hydrous calcium silicate composed of pure crystalline integrated crystals having the sole formula $5CaO \cdot 5SiO_2 \cdot H_2O$ and being continuously integrated, that is, xonotlite, can be formed. These materials are prepared by combining line and silica together with a minor proportion of asbestos and sufficient water to form an aqueous slurry and thereafter exposing the slurry to saturated steam and above atmospheric pressure conditions as achieved in an autoclave. A hydrous calcium silicate of the highest stability to elevated temperature is produced where the lime and silica are maintained in approximately equimolar proportion and the water component is initially maintained in a saturated condition with respect to the lime and is so maintained during the induration (saturated steam and above atmospheric pressure conditions) whereby a continuous reaction of the aqueous lime proceeds to yield an initial product having the formula $2CaO \cdot SiO_2 NH_2O$, which then converts through a sequence of reactive hydrous silicates of lime to the formation of tobermorite $$4CaO \cdot 5SiO_2 \cdot 5H_2O$$

which assuming equimolar proportioning of the lime and silica proceeds to xonotlite having the formula indicated hereinabove; namely, 5CaO·5SiO₂·H₂O. The lime and silica, however, can be maintained within the molar proportion of 4:5 to 5:5 (lime/silica) to yield a combination integrated crystalline structure of tobermorite and xonotlite.

The hydrous calcium silicate insulating materials are strong and resilient and at the same time refractory to high temperature. Where the proportion of lime and silica is controlled to yield xonotlite, the product is essentially chemically inert. The slurry from which the crystalline product emanates includes an amount of water selected to yield a product of desired density. Thus, it is possible, by selecting the appropriate amount of water, to vary the density of the ultimate product from 7 to 50 pounds per cubic foot. A water to solids ratio (wherein the solids include the sum of the amounts of silica, lime, clay, asbestos, miscellaneous filler and the like) of 3 to 1 will yield an approximately 21 pounds per cubic foot (p.c.f.) product. A ratio of water to solids of approximately 1 to 1 is definitive of a product having a density of about 50 pounds per cubic foot. A ratio of water to solids of aproximately 9.0 to 1.0 yields an extremely low density product; namely, about 7 pounds per cubic foot. A typical formulation for an integrated crystalline hydrous calcium silicate insulating material of utility in the manufacture of core members for "fire door" constructions in accordance with the present invention is set forth in Table 2 below.

Table 2

Ingredients: Parts by weight
- Tripoli (99% SiO₂) _____ 1,000
- Lime (94% CaO) _____ 1,000
- Fibrous asbestos _____ 800
- Water _____ 9,520

To prepare slabs of the core material, a slurry mixture of the ingredients of Table 2 is blended together in a suitable mixing apparatus. The slurry mixture then is poured into a shallow pan of rectangular configuration and to a depth corresponding to the desired thickness of the core slab. The shallow pan is then introduced into an autoclave wherein a temperature of 208° C. (406° F.) and a gauge pressure of 250 pounds per square inch is maintained. In about 4 hours or longer, depending upon the thickness, the reaction of the lime and silica through the several stages noted above will have occurred, yielding a final, dry, pure crystalline integrated network of xonotlite. The network will be interspersed with voids in which the aggregate volume thereof is in excess of that of the crystals. A density determination reveals a product having a density of about 17 pounds per cubic foot. The slabs may then be fabricated to the desired length dimension together with appropriate tongues and/or grooves formed on the edges, permitting assembly thereof into a door of constructional detail as shown in FIGS. 2–5.

A door constructed in the above fashion, utilizing a thermal barrier adhesive composition of the formulation described in Example I, will meet the fire testing requirements of door assemblies in accordance with the American Society for Testing Materials, Test Designation E–152–58. While the full description of the test need not be reproduced here, it will simply be mentioned that the door is located in a frame and one side of the door is exposed to a heat source producing elevated temperature conditions controlled to increase at a steady rate while temperature readings in the door and on the cool side of the door are taken. At the same time, the edges of the doors are observed to note any deflection in the edge or "jam" area. A door construction as described herein when subjected to the referred-to A.S.T.M. tests will endure a 1½ hour exposure to temperatures ultimately reaching 1750° F.

In Table 3, the temperature readings on the hot side of a door are listed after given intervals of time. These temperature/time conditions meet the above A.S.T.M. tests. At the same time, typical cooler temperatures attainable on the cold side of a door construction in accordance with the present invention are listed.

TABLE 3

| Time | Temperatures, ° F. | |
|---|---|---|
| | Hot Side | Cold Side |
| 5 minutes | 1,000 | |
| 10 minutes | 1,300 | |
| 30 minutes | 1,550 | 156 |
| 40 minutes | | 350 |
| 50 minutes | | 500 |
| 1 hour | 1,700 | |

The "fire door" may be desirably fabricated in a somewhat different manner than that described hereinabove before Example I. Thus, the frame elements, facings and calcium silicate core elements may be located in assembled relationship before application of the thermal barrier adhesive. In such case, the elements would be fabricated in such fashion as to leave a space or passageway between ultimately adhesively secured edges and surfaces, all of these being in communicating relationship. Additionally, one of the frame elements includes a hole connecting with the space or passageways. Finally, the thermal barrier adhesive is pressure fed through the hole and into the spaces, passageways or cavities, filling same and serving to unit all the elements upon drying. It may also be desirable in the interest of productiveness to treat a plurality of frame elements with an initial deposition of the coating in the grooves by a mass production technique and thereafter removing a portion to provide for mating engagement with the "tongue" edge of the silicate core elements. A variety of similar procedures are suggestible as to expediting the erection and assembly of the several components into a final unitary door construction.

It is a feature of the present invention that the thermal barrier adhesive evidences very desirable thermal stability upon exposure to the ever increasing temperature exposure. Other conventional adhesives of the phenol-resorcinol type are organic and, consequently, flammable. Even with the inclusion of phosphorous and/or antimony compounds as fire retardants, the flammability is not decreased to a satisfactory level. Furthermore, the thermal character of the known adhesives leads to warpage of the planar door at the edges whereby deflection is marked and, as a consequence, the requirements of A.S.T.M. E–152–58 are not met.

The thermal barrier adhesive coating as described herein has been found to be very useful as a coating for light weight refractory insulation as incorporated into the fire chamber of gas fired heaters and like equipment. In such applications the insulation is exposed to gas temperatures in the neighborhood of 2100° F., developing 1300° F. temperature on the insulation surface. This temperature has been known to cause warping with the result that heat escapes, reducing the efficiency of the unit. Also, other components of the heaters are adversely effected by the temperatures. By securing the light weight insulation to the metal superstructure through the use of the thermal barrier adhesive (1/32″ thick) as described herein and additionally applying a facing coating (1/32″ to 1/16″ thick) thereof to the insulation, it has been found that the foregoing problems have been overcome.

It is another feature of the present invention that the thermal barrier adhesive coating of the present invention exhibits remarkable adhering qualities in bonding together the hydrous calcium silicate insulating materials with a variety of substrates, e.g., wood, metal, etc., whereby a number of other commercial applications utilizing the hydrous calcium insulating materials are beneficially effected and improved by the adoption of this adhesive composition.

It is found that the insulating materials specifically described hereinabove and defined as hydrous calcium silicates are in and of themselves improved by the addition, to one or both planar sides, of a layer of the thermal barrier adhesive coating of the present invention. Thus, the thermal barrier very readily attaches itself to the surface since the porous character allows a controlled penetration of the coating as setting at room temperature occurs. The coating can be applied by brush, knife, spray gun or in any manner most convenient. It may be contoured since it is formable for several minutes (about 5) after application. Upon setting, the coating forms a hardened "case" which is structurally stronger and more impervious, in mose cases, than the crystalline silicate insulating material itself. A plurality of coatings can be applied of various thicknesses to meet the service requirements of the particular application.

Almost any structural element likely to be exposed to flame or elevated temperature conditions, particularly in combination with high velocity gas flow, can be protected by the application of one or more layers of the thermal barrier adhesive coatings disclosed generally herein and specifically in Table 1.

One shortcoming of the adhesive composition thermal barrier of the present invention is its relatively short shelf-life or pot-life once the several ingredients have been combined to form the aqueous mixture of paint-like viscosity. Accordingly, it may be desirable under certain circumstances to prepare the composition as two separate mixtures (keeping certain ingredients apart) and combine them only at the actual time of application as, for example, through a spray gun setup adapted to meter and mix appropriate amounts of two separate mixtures as they emanate from the gun onto a desired substrate to be joined.

Modifications may be resorted to without departing from the spirit and scope of the present invention.

We claim:

1. In combination, a body consisting essentially of a hydrous calcium silicate insulating material of crystalline integrated character coupled with a density below 50 pounds per cubic foot, a second body of a different material and a bonding layer adhering said bodies together, said layer including an air dried mixture initially including a major proportion of a finely divided refractory, a minor proportion of a mixture of basic metal oxide and a water soluble phosphate salt, a minor proportion of colloidal silica and water.

2. The combination as claimed in claim 1, wherein the finely divided refractory ranges from about 70 to about 90% by weight exclusive of water, the basic metal oxide constitutes from about 4 to about 10% by weight exclusive of water and the phosphate salt constitutes from about 7 to about 19% by weight exclusive of water and the colloidal silica constitutes from about 3 to about 6 parts by weight based on the total of refractory, phosphate and basic metal oxide.

3. The combination as claimed in claim 1, wherein the phosphate salt is selected from the group consisting of acid salts of ortho, meta and pyrophosphoric acid with lithium; magnesium; calcium; ammonium; strontium; barium; copper; zinc; cadmium; and the organic amino phosphates.

4. In combination, a substrate formed of a hydrous calcium silicate and a thermal barrier coating, said coating including an air dried layer composed of a major proportion of finely divided refractory, a minor proportion of a mixture of a basic material selected from the group of basic metal oxides and hydroxides and mixtures thereof, a minor proportion of a phosphate salt and a minor proportion of silica particles of colloidal size.

5. The combination as claimed in claim 4, wherein said layer is applied as a slurry mixture of the recited ingredients and a portion of said silica particles of colloidal size are contained in said substrate.

6. The combination as claimed in claim 4, wherein said substrate is a rectangular slab constituting the principal component of a door, and further including a marginal frame peripherally secured to said rectangular slab by means of said thermal barrier coating.

7. The combination as claimed in claim 6, which includes a pair of facing sheets adhesively secured to said marginal frame and said slab, said adhesive securement being provided by said thermal barrier coating.

8. The combination as claimed in claim 7, wherein said thermal barrier coating is composed of (1) a major proportion of finely divided silica, (2) a minor proportion of magnesium oxide, (3) a minor proportion of an acid salt selected from the acid salts of ortho, meta and pyrophosphoric acid with lithium, magnesium, calcium, ammonium, strontium, barium, copper, zinc, cadmium and mixtures thereof, and (4) a minor amount of colloidal silica.

9. In combination, a body consisting essentially of a hydrous calcium silicate insulating material of crystalline integrated character coupled with a density below 50 pounds per cubic foot and a coating layer integrally secured to said material, said layer including an air dried mixture initially including a major proportion of a finely divided refractory, a minor proportion of a mixture of basic metal oxide and a water soluble phosphate salt, a minor proportion of colloidal silica and water.

10. In combination, a substrate formed of a hydrous calcium silicate having a porous, three-dimensional, crystalline, integrated structure and a thermal barrier coating, said coating including an air dried layer composed of a major proportion of finely divided refractory, a minor proportion of a mixture of a basic material selected from the group of basic metal oxides and hydroxides and mixtures thereof, a minor proportion of a phosphate salt and a minor proportion of silica particles of colloidal size.

11. The combination as claimed in claim 10, wherein said layer is applied as an aqueous slurry mixture of the recited ingredients and a portion of said silica particles of colloidal size are contained in said pores.

12. The method of adhering a porous hydrous calcium silicate body to another body which comprises applying to the surface of one of said bodies an aqueous mixture including a minor proportion of a basic material selected from the group consisting of metal oxides, metal hydroxides and mixtures thereof, a minor proportion of a water soluble phosphate salt, a minor proportion of colloidal silica and a major proportion of finely divided refractory, holding the other body in contact with said coated body and allowing the coating mixture to harden.

13. The method as claimed in claim 12, wherein the basic material ranges in an amount from about 4 to about 10% by weight exclusive of water, the phosphate salt ranges in an amount from about 7 to about 19% by weight exclusive of water and the finely divided refractory ranges in an amount from about 70 to about 90% by weight exclusive of water.

14. The method of adhesively securing together two bodies formed of dissimilar materials, one of which is a hydrous calcium silicate of integrated crystalline composition, which comprises:
  applying to the surface of the silicate body an aqueous mixture including a minor proportion of a basic material selected from the group consisting of metal oxides, hydroxides and mixtures thereof, a minor proportion of a water soluble phosphate salt, a minor proportion of colloidal silica and a major proportion of finely divided refractory,
  holding the other member in firm contact with the coated surface of the silicate member and
  allowing said mixture to set.

15. The method of adhesively securing together two bodies formed of dissimilar materials, one of which is a hydrous calcium silicate of integrated crystalline composition having the formula $5CaO \cdot 5SiO_2 \cdot H_2O$, which comprises applying to the surface of the silicate body an aqueous mixture including a minor proportion of a basic metallic oxide, a minor proportion of a water soluble phosphate salt, a major proportion of finely divided refractory, the latter including a major proportion of one of the group conisting of silica and a precursor of silica, and a minor proportion of colloidal silica, holding the other member in firm contact with the coated surface of the silicate member and allowing said mixture to set.

References Cited

UNITED STATES PATENTS

| | | | |
|---|---|---|---|
| 2,391,493 | 12/1945 | Wainer et al. | 106—121 |
| 2,450,952 | 10/1948 | Greger | 106—121 |
| 1,961,888 | 6/1934 | Lindsay | 161—43 |
| 2,350,030 | 5/1944 | Greider | 117—123 |
| 2,874,071 | 2/1959 | Kadisch | 117—123 |
| 2,593,050 | 4/1952 | Paul et al. | 20—35 |
| 3,100,952 | 8/1963 | Hall | 50—437 |
| 3,142,609 | 7/1964 | Deretchin et al. | 161—210 X |

HAROLD ANSHER, Primary Examiner

T. R. SAVOIE, Assistant Examiner

U.S. Cl. X.R.

106—105; 117—123, 138; 156—325; 161—206, 403